Patented Nov. 23, 1937

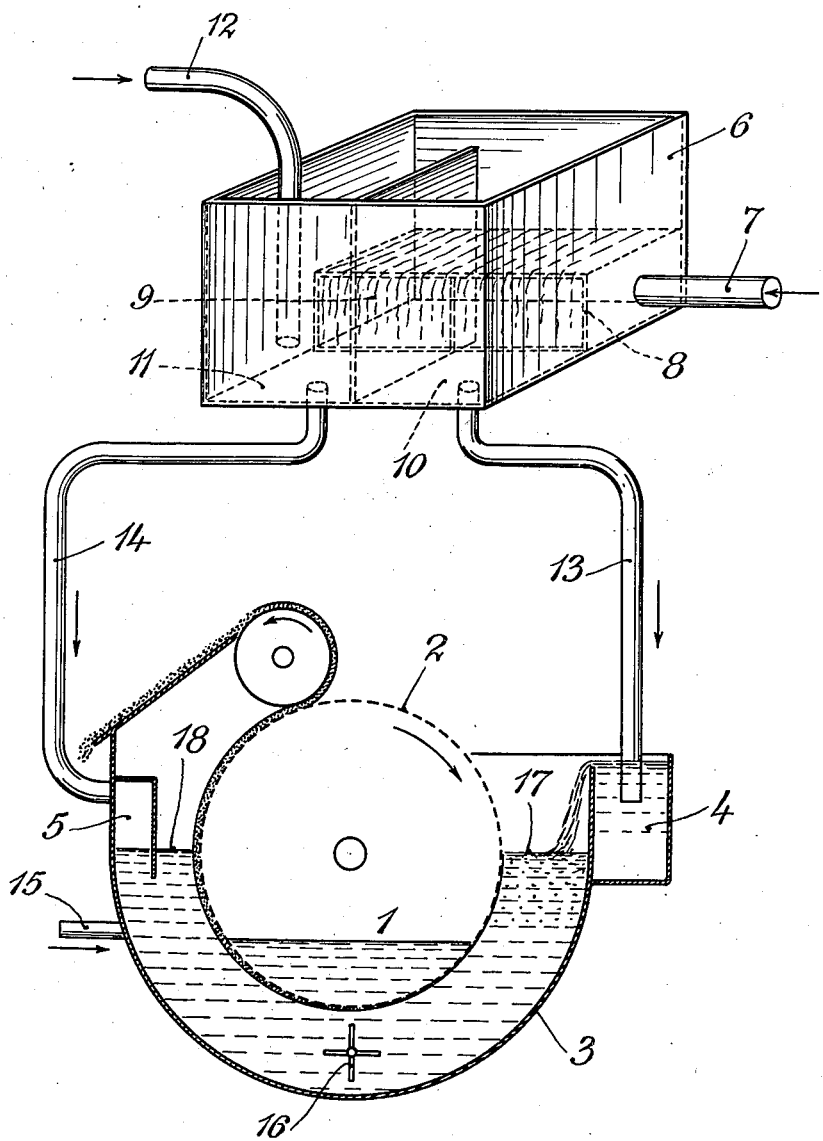

2,100,149

UNITED STATES PATENT OFFICE 2,100,149

METHOD AND ARRANGEMENT FOR FILTERING WASTE WATER (BACK WATER) FROM PAPER, CELLULOSE, AND WOOD PULP FACTORIES, ETC.

Olaf Qviller, Oslo, Norway, assignor to A/S Thunes Mekaniske Værksted, Skörjen by Oslo, Norway Application February 14, 1936, Serial No. 63,946
In Norway December 18, 1934

5 Claims. (Cl. 210—201)

Ordinary waste water, so-called "back water" from paper factories, cellulose factories, wood pulp factories etc. contains some very fine fibres and finer particles, so-called "flour substance", which it is difficult to recover. If one tries to strain the back water through a fine strainer netting, the netting is rapidly obstructed, and one obtains a very low production, even in the large filters. Besides, a great proportion of the fibres in the back water will pass through the netting before a filtering layer has been formed on the filter drum which consequently operates with low efficiency. In order to increase the efficiency a portion of coarser fibres has been added to the back water in order to have formed thereby a mixture, from which a filter layer has been built up upon the strainer netting, and experience has shown that such an admixture of coarser fibres increases the production capacity on the filter and also assists in yielding a better filtration. However, even this method is not quite satisfactory.

The present invention has for its purpose to provide a somewhat different method, whereby a very efficient separation of the fibres from the back water and also a great production may be obtained, and it is especially adapted for filtering back water in paper factories, which produce their cellulose themselves.

The method consists in causing the formation of a filtering layer of coarse fibers on a cloth filter by supplying to said cloth filter a pulp containing coarse fibers and no waste water, then supplying to the filter, waste water admixed with coarse fibers, in order to filter the waste water through the said first layer of coarse fibers and thereby causing the said layer to collect additional fibers consisting of an even mixture of the fine fibers from the waste water and added coarse fibers, and then removing the resulting layer from the cloth.

This method may be carried out by filtering through a rotating filter cloth-drum partly submerged in pulp water, said waste water being obtained from paper factories, cellulose factories, pulp factories, etc., said method consisting in causing the formation of a filtering layer of coarse fibers on the cloth of said drum at a place travelling downwards in the pulp, by supplying to the cloth a pulp containing coarse fibers and no waste water, then supplying to the cloth of the drum at another place further on in the travelling direction waste water admixed with coarse fibers, so as to filter the waste water through the said layer of coarse fibers having been formed at the arrival of any cloth portion to the last-named place and to cause thereby the said layer during its travel from the last-named place to collect additional fibers consisting of an even mixture of the fine fibers from the waste water and added coarse fibers, and then continuously removing the resulting layer from the cloth.

The drawing shows diagrammatically an embodiment of the arrangement. 1 is a filter drum with strainer netting 2. The filter drum rotates in a strainer box 3 having an inlet 4 for cellulose arranged at the down-travelling side of the drum netting and an inlet 5 for a mixture of back water and cellulose at the upwards-travelling side of the netting. To a regulating box 6 for constant level the cellulose is supplied at its rear half through the pipe 7. By means of two adjustable dams 8 and 9 the cellulose may be distributed to one compartment 10 and to another compartment 11, both arranged in the front half of the box.

To the compartment 11 back water is also supplied through the pipe 12. The two compartments 10 and 11 are connected through pipes 13 and 14 with the supplies 4 and 5 respectively. By adjusting the dam 8 the quantity of cellulose supplied to the strainer through the supply 4 may be regulated. By regulating the dams 8 and 9 in relation to each other the quantity of cellulose may be adjusted which is supplied in order to form the first filter layer on the drum, and by regulating the dam 9 the quantity of cellulose which is mixed with the back water and passed to the supply 5 may be regulated. The mixture of back water and coarse fibres is here formed in the compartment 11. However, it may also be formed in the pulp or strainer box 3 itself by supplying only back water at 5 and just in the neighborhood cellulose pulp, for instance at 15, and in the box also a stirrer 16 may be arranged at a suitable place.

In the illustrated construction the pulp water (fibre pulp) in the strainer box 3 will be richest in cellulose fibres at the immerging place 17 and from this place downwards it will be constantly thinner. At the left hand side at the emerging place 18 also pulp water will be present which is comparatively rich in back water fibres and added cellulose fibres and which also will be thinner downwards in the box, so that the least concentrated pulp water is present at a place in the lowermost portion of the drum.

Also the possibility might be suggested to supply firstly the whole cellulose quantity and then to form a thick filter layer of cellulose on the filter netting 2 and thereupon to strain mere back water through the layer. In this manner, however, the finer fibres will all be collected in a thin layer outside the cellulose, and experiment shows that the straining in such case takes place comparatively slowly. By distributing the cellulose quantity in the manner mentioned above the fine fibres are distributed in the back water into a relatively thick cellulose layer, whereby the flowing through the filter layer is by far not checked so strongly as is the case in the above example. An experiment shows that in case 60 liter of back water have been strained through 1 $m^2$ of cellulose layer with a thickness corresponding to 500 gr. dry cellulose pr. $m^2$, the straining time for the back water is about 18 sec. By forming firstly a pulp layer corresponding to 300 gr. cellulose and then mixing the back water with a cellulose quantity causing a layer corresponding to 200 gr. pr. $m^2$ the filtering of the back water may be effected in 6 to 7 seconds. From this experiment it appears that the straining in this manner may be effected in a much more efficient manner or that, in order to obtain the same capacity, a strainer of considerably less dimensions may be used.

I claim:

1. Method of collecting fibers and finer particles from waste water by filtering through a cloth filter, said waste water being obtained from paper factories, cellulose factories, pulp factories etc., said method consisting in causing the formation of a filtering layer of coarse fibers on the cloth filter by supplying to said cloth filter a pulp containing coarse fibers and no waste water, then supplying to the filter waste water admixed with coarse fibers, in order to filter the waste water through the said first layer of coarse fibers and thereby causing the said layer to collect additional fibers consisting of an even mixture of the fine fibers from the waste water and added coarse fibers, and then removing the resulting layer from the cloth.

2. Method of collecting fibers and finer particles from the waste water by filtering through a rotating filter cloth drum partly submerged in pulp water, said waste water being obtained from paper factories, cellulose factories, pulp factories etc., said method consisting in causing the formation of a filtering layer of coarse fibers on the cloth of said drum at a place travelling downwards in the pulp by supplying to the cloth a pulp containing coarse fibers and no waste water, then supplying waste water at another place of the cloth on the drum positioned further on in the travelling direction, said waste water being admixed with coarse fibers, so as to filter the waste water through the said layer of coarse fibers having been formed at the arrival of any cloth portion to the last named place and to cause thereby the said layer during its travel from the last-named place to collect additional fibers consisting of an even mixture of the fine fibers from the waste water and added coarse fibers, and then continuously removing the resulting layer from the cloth.

3. A strainer apparatus comprising a strainer box, a rotatable filter cloth drum partly submerged in pulp water contained in said box, an inlet for pulp supply of coarse fibers to the box arranged at the side of the drum moving downwardly in the box and a second inlet, means for supplying to the second inlet a mixture of waste water and coarse fibers arranged in the box at a place further on in the cloth travelling direction than the first-mentioned supply inlet, and means for continuously removing from the cloth on its upwardly travelling portion the layer of coarse and fine fibers.

4. A strainer apparatus comprising a strainer box, a rotatable filter cloth drum partly submerged in pulp water contained in said box, an inlet for supplying pulp of coarse fibers to the box arranged at the side of the drum moving downwardly in the box, two additional inlets arranged in the box at places further on in the cloth travelling direction than the first-mentioned supply inlet, means for supplying waste water to one of the said additional inlets, means for supplying coarse fiber pulp to the other one of said additional inlets, and means for continuously removing the layer of coarse and fine fibers from the cloth on its upwardly travelling portion.

5. In combination with a strainer apparatus claimed in claim 3, a regulating box for connection with the first and second supply inlets, consisting of a compartment connected with a source of cellulose pulp supply and two outlet compartments, both in open connection with said supply compartment, a piping from one outlet compartment to the first drum supply inlet, the last-named compartment being also provided with an inlet for waste water.

OLAF QVILLER.